Dec. 18, 1945.  F. E. KELLY  2,391,167
FISHING TACKLE
Filed Jan. 6, 1944
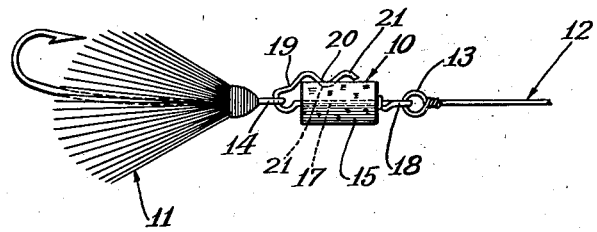
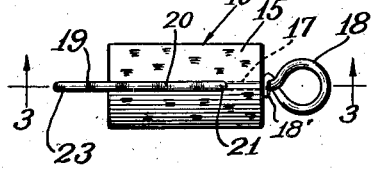
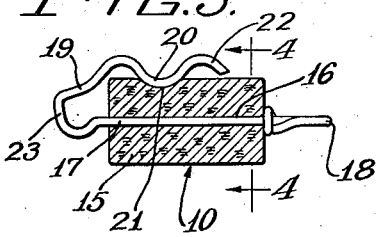
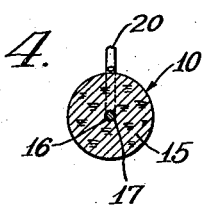
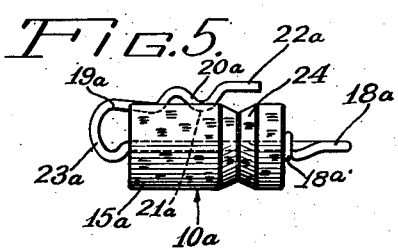
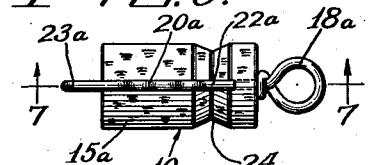
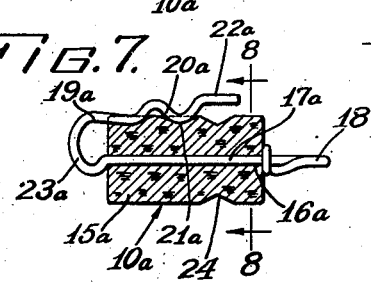
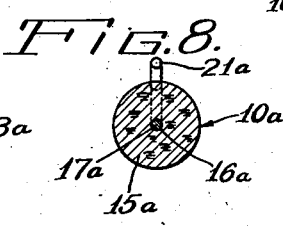
Inventor:
Frank E. Kelly
By Wallace and Cannon.
Attorneys Patented Dec. 18, 1945

2,391,167

UNITED STATES PATENT OFFICE 2,391,167

FISHING TACKLE

Frank E. Kelly, Chicago, Ill.

Application January 6, 1944, Serial No. 517,157

1 Claim. (Cl. 43—28)

This invention relates to fishing tackle and, more particularly, to a buoyant clamping device by means of which a so-called fly or other form of fish bait or lure may be conveniently and readily attached in position of use upon, and detached from, a fishing line.

Accordingly, an object of the present invention is to afford a new and improved and relatively simple device by means of which a so-called fly or the like may be readily attached to or detached from a trout casting line or to a metal clasp which constitutes a part of the device.

Another object of the invention is to provide a new and improved device by means of which a so-called fly or the like may be readily attached to or detached from a trout casting line or to a metal clasp which forms a part of the device, and wherein there is provided a novel construction and arrangement of a clamping means and float carried thereby, so that the float is prevented from movement with respect to the clamping means or vice versa.

An additional object of the invention is to afford in one form thereof a novel fly clamping or attaching device by means of which a disturbance may be effected in the water when the clamping device is moved therethrough in advance of the fly during the casting or like fishing operation.

Other and further objects of the present invention will be apparent from the following description and claims and will be understood by reference to the accompanying drawing which, by way of illustration, shows preferred embodiments and the principle thereof and what I now consider to be the best mode in which I have contemplated applying those principles. Other embodiments of the invention embodying the same or equivalent principle may be used and structural changes may be made as desired by those skilled in the art without departing from the present invention and the purview of the appended claim.

In the drawing:

Fig. 1 is an elevational view illustrating a preferred embodiment of the new buoyant clamping device showing the same attached in position of use between the end portion of a casting line and a so-called trout fly;

Fig. 2 is a plan view of the clamping device embodied in the form of the invention shown in Fig. 1;

Fig. 3 is a longitudinal sectional view on line 3—3 in Fig. 2;

Fig. 4 is a transverse sectional view on line 4—4 in Fig. 3;

Fig. 5 is an elevational view illustrating a modified form of the new buoyant clamping device;

Fig. 6 is a top plan view of the form of the invention shown in Fig. 5;

Fig. 7 is a longitudinal sectional view on line 7—7 in Fig. 6; and

Fig. 8 is a transverse sectional view on line 8—8 in Fig. 7.

A preferred embodiment of the new buoyant clamping device is illustrated in Figs. 1 to 4, inclusive, of the drawing, and it is therein generally indicated at 10, and is shown as being associated with and disposed between a conventional trout fly, indicated at 11, and a fishing line indicated at 12.

As shown in Fig. 1, the fly 11 has a looped wire attaching portion 14 formed integrally therewith.

The new fly clamping device 10 comprises a buoyant float 15 which may be made of cork, or any other suitable buoyant material, such as wood, and extending centrally and longitudinally through the body 15 is an opening 16.

The new clamping device 10 also includes a small rod-like wire body or shank portion 17 which extends through the central longitudinal opening 16 in the buoyant body 15 and this body portion 17 has a looped portion 18 formed at one end thereof in one plane, as here shown, a horizontal plane, and the end of the looped portion 18' is looped about the shank 17 in another plane substantially at a right angle to the loop 18 and substantially contacts one end of the float 15. The end portion 13 of the trout casting or like fishing line 12 is inserted through the looped portion 18 and bent back upon itself so as to secure the new clamping device 10 to the end portion of the line 12.

The new clamping device 10 also includes a flexible spring clamping portion 19 which is formed integrally with the body portion 18 thereof and this spring clamping element 19 includes a substantially U-shaped mid-portion 20 which is normally urged by its own resiliency into a recess or depression 21 which is provided therefor in the peripheral surface of the buoyant float 15. The new clamping device 10 also includes a curved bight portion 23 at and substantially contacting the other end of the float 15 and which extends between the rod-like body portion 17 and the spring clamping element 19.

The foregoing arrangement is such that in order to attach a fly, as 11, or other fish bait or lure, in position of use upon the casting or like fishing line 12 and to the new clamping device 10, it is merely necessary to project the looped end portion 14 of the fly 11 under the free end portion 22 of the resilient or spring clamping element 19—20—21 and to force the said looped end portion 14 under the mid-portion 20 and back into the curved bight or looped portion 23 of the clamping element to which the fly 11 is normally secured in use.

It will thus be seen that a fly, as 11, or other fish bait or lure, may be readily attached to and detached from the new clamping device 10, thus facilitating changing of the fly or other lure or bait without the inconvenience and the difficulty and delay involved in the prior practice of attaching the fly directly to the end of a casting line or to a metal clasp carried thereby.

A slightly modified form of the invention is illustrated in Figs. 5 to 8, inclusive, and in this form of the invention those parts which are similar to corresponding parts illustrated in Figs. 1 to 4, inclusive, have been given the same reference numerals followed by the distinguishing reference character "a."

The form of the invention shown in Figs. 5 to 8, inclusive, is substantially similar to the form of the invention shown in Figs. 1 to 4, inclusive, except for an annular groove 24 which is provided in the buoyant float 15a adjacent one end portion thereof.

In the use of the modified form of the new clamping device shown in Figs. 5 to 8, inclusive, the annular groove 24 provides a disturbance in the water in advance of the fly 11 as the fly moves through the water, thereby enhancing the attraction of the fish for the fly bait. However, except as thus indicated, the use of the modified form of the new clamping device shown in Figs. 5 to 8, inclusive, is substantially similar to the use of the form thereof shown in Figs. 1 to 4, inclusive, and hence need not be described in detail.

It will also be noted that in use the new buoyant clamping device assists in keeping the fly, as 11, afloat whereas the metal clamps heretofore used have had a tendency to cause the fly to submerge in use which is objectionable in the use of a fly in trout casting and the like since such flies are effective in attracting trout only when floating upon the surface of the water.

It will thus be seen from the description, considered in conjunction with the drawing, that the present invention provides a novel clamping device wherein movement of the float body with respect to the shank on which it is mounted is prevented and by means of which a trout fly or other artificial fish bait or lure may be readily attached to or detached from the end portion of a casting line or other fishing line, or to a metal clasp which constitutes a part thereof, and that the invention thus accomplishes its intended objects and has the desirable advantages and characteristics including those hereinbefore pointed out and others which are inherent in the invention.

I claim:

An attachment for detachably securing a fly hook unit to a fishing line comprising a float provided with a central longitudinal opening and a clasp, said clasp consisting of a wire having at one end a loop in one plane terminating with a loop at substantially right angles thereto and surrounding a portion of the wire, said portion constituting a shank adapted to be received in the opening, said wire having a third loop at the opposite end of the shank transverse to the planes of the former loops and having portions thereof in contact with one end of and the peripheral surface of the float and extending longitudinally along the surface of the float and provided at its free end with a portion spaced from said surface, a portion inwardly thereof being of plural hump formation with one of the humps in penetratable engageable relation with said float, the second and third loops constituting stops to prevent longitudinal movement of the wire relative to the float, said wire being of such resiliency as to permit displacement of the hump portions relative to the float surface whereby an eye of a fly can be guided in contact with the latter free end past the humps into assembled relation with the third loop.

FRANK E. KELLY.